Figure 1:
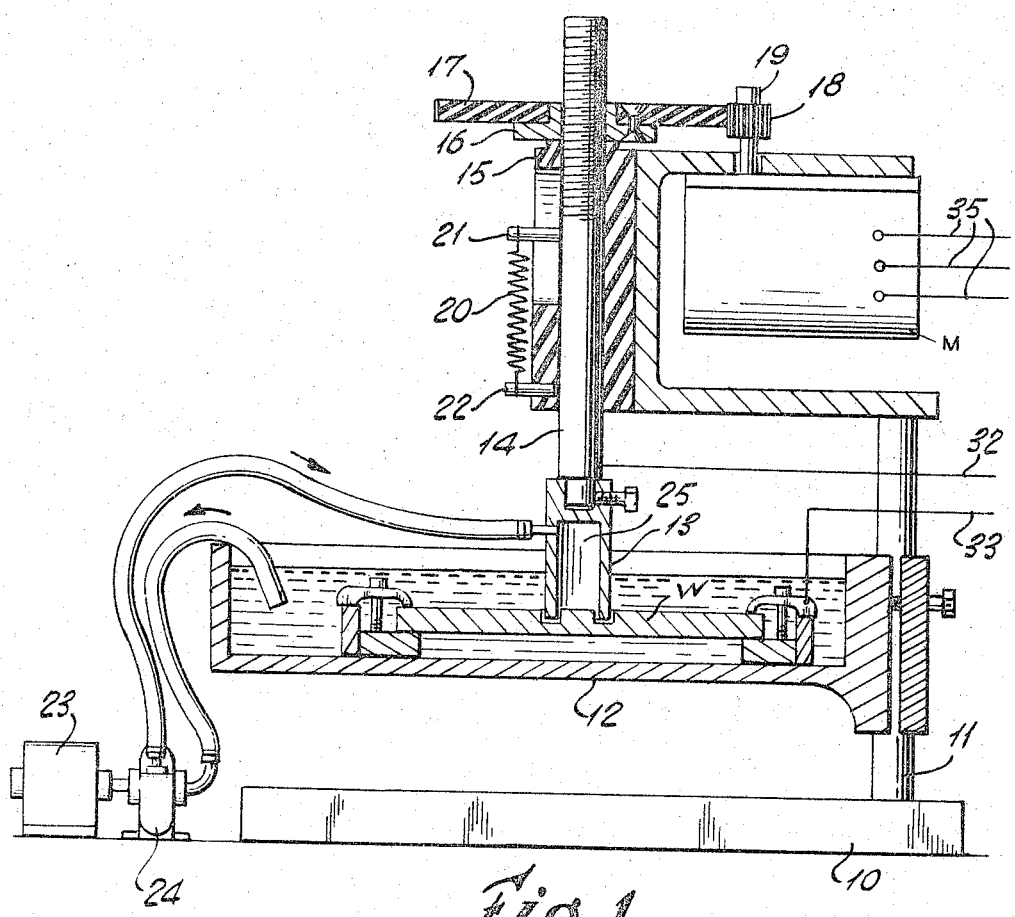

INVENTORS
JOSEPHINE L. WILLIAMS
MILTON J. RIDDLES

United States Patent Office

3,334,210
Patented Aug. 1, 1967

3,334,210
ELECTRO-DISCHARGE MACHINING FLUID
AND METHOD
Josephine L. Williams, Loveland, and Milton J. Riddles, Wyoming, Ohio, assignors to The Cincinnati Milling Machine Company, Cincinnati, Ohio, a corporation of Ohio
Filed May 22, 1964, Ser. No. 369,361
11 Claims. (Cl. 219—69)

This application is a continuation in part of our prior application Ser. No. 202,481, filed June 14, 1962, now abandoned.

This invention relates to electro-discharge machining and more particularly to a method of electro-discharge machining wherein a novel machining fluid is used to achieve improved machining efficiency.

As is well known in the machining art, electro-discharge machining is carried out by applying a high frequency voltage of the order of 50 to 600 volts across an electrode and closely spaced work piece with an essentially nonconductive machining fluid in the gap therebetween in such manner that electrical discharges from electrode to the work piece occur in short bursts to remove metal from predetermined areas of the work piece. The machining fluid performs a number of different functions in this process. Thus the fluid is ordinarily caused to flow continuously through the gap between the electrode and work piece to entrain and remove physically from the machining area particles of metal detached from the work piece and electrode. The flow of machining fluid also serves to cool the surfaces being machined. Commonly the machining fluid is filtered and recirculated to the machining area. The machining fluids previously used comprised hydrocarbon oils, silicone oils and related materials.

In addition to its cooling and entrainment function, the machining fluid participates actively in the metal removal operation. Thus the fluid must be sufficiently nonconductive to cause the desired voltage to build up across the gap between the electrode and the work piece and sufficiently conductive at elevated voltages to insure the occurrence of an electrical discharge for each voltage cycle.

One of the factors that has retarded the development of electro-discharge machining is the relatively high rate at which electrodes are consumed in this process. In some cases the quantity of metal removed from the electrode has been almost as great as the quantity removed from the work piece. In general, the efficiency of the electro-machining process as measured by the ratio of metal removed from the work piece to metal removed from the electrode has been relatively low. This ratio will be referred to in the present specification as the metal removal efficiency.

It is an object of the present invention to provide an electro-discharge machining process having a substantially higher metal removal efficiency than prior processes. It is another object of the invention to provide an electro-discharge machining process wherein machining fluids are employed that have not previously been used in such processes and that provide improved metal removal efficiency in such processes. It is still another object of the invention to provide a novel class of machining fluids which when employed in previous known types of electro-discharge machining operations result in improved metal removal efficiency. Other objects of the invention will be in part obvious and in part pointed out hereafter.

The present invention is based on the discovery that a substantial improvement in metal removal efficiency of an electro-discharge machining operation of the type referred to above can be achieved by using, in place of the oils previously used, a machining fluid which is essentially an aqueous solution of a glycol of the general formula $HOCH_2(CH_2OCH_2)_nCH_2OH$ wherein $n$ is selected from zero and the positive integers. It has been found that where such aqueous solutions of glycol are used, metal removal efficiencies can be obtained that are several times as great as those achieved with oils of the type previously proposed for this application.

The glycols falling within the scope of the above formula include ethylene, diethylene and triethylene glycols, as well as higher glycols, including solid glycols, such as those sold under the trade name Carbowax. The Carbowax polyethylene glycols are presently available commercially with molecular weights as high as 6000 to 7500, which corresponds to $n$ values of about 120 to 150. While any of these polyglycols can be used, it has been found that the higher molecular weight materials should desirably be blended in minor amount with a major amount of lower molecular weight materials in order to avoid solutions having excessively high viscosities. In cases where the viscosity of the solution may be undesirably high because of the presence therein of high molecular weight materials, a suitably low viscosity can often be achieved by heating the solution to an elevated temperature.

Especially good results have been obtained when using as the glycol constituents of the present composition polyglycols having molecular weights in the range 150 to 300, or alternatively blends of the 150 to 300 M.W. material with minor amounts of 1000 to 1500 M.W. polyglycol. More generally, it has been found that in most cases the polyglycol component or components should desirably be so chosen that they have molecular weights corresponding to $n$ values no higher than about 35 in the above formula.

The optimum concentration of glycol in the solution varies to some extent with the type of glycol used. In general the aqueous solution should desirably contain from 50% to 95% by volume of the glycol, preferably 65% to 90% by volume of glycol.

It has been further found that tool wear in the electro-discharge machining process can be substantially reduced with only a relatively small decrease in metal removal rate by adding to the aqueous glycol machining fluid a third component which is a monoether of a glycol of the general formula $ROCH_2(CH_2OCH_2)_mCH_2OH$ wherein $m$ has the value zero to 10 and R is selected from the group consisting of alkyl, aryl, alkaryl and aralkyl radicals having 1 to 20 carbon atoms. The use of such a ternary mixture is especially important in cases where the tool is composed of a relatively soft metal, such as a brass or a zinc-tin alloy, both of which are often used in electro-discharge machining operations. Typical glycol monoethers useful in the present compositions are ethylene glycol monoethyl ether, ethylene glycol monomethyl ether, ethylene glycol monohexyl ether, the octylphenyl ether of octaethylene glycol, the nonylphenyl ether of octaethylene glycol and ethylene glycol monophenyl ether. The ternary mixtures preferably comprise from 35% to 70% by volume of the ethylene and/or polyethylene glycol, from 2.5% to 35% by volume of the glycol monoether and from 5% to 35% by volume of water.

Commercial machining fluids prepared according to the present invention may contain, in addition to the principal constituents referred to above, various special purpose ingredients in small quantities. For example, the compositions may include a conventional rust inhibitor such as an alkanolamine, fatty acid amide or soap to the extent of say 0.5% to 2.5% by volume. Also a surface active agent may be added in an amount up to a few percent to assist in maintaining the particles of detached metal in suspension until they have been removed from the area of the tool and work piece.

Figure 2:
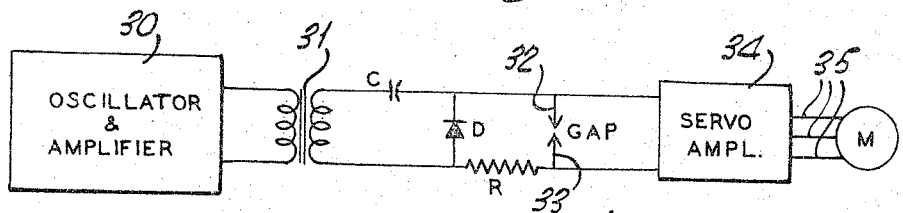

In order to point out more fully the nature of the present invention, a number of specific examples are given below of illustrative formulations of machining fluids embodying the invention and data concerning the operating effectiveness of these fluids. These formulations were evaluated in apparatus of the type shown in the accompanying drawing wherein:

FIGURE 1 is a diagrammatic elevation of an electro-discharge machining apparatus, taken partly in section axially of the electrode, and FIGURE 2 is a diagram of an electrical circuit used to supply electrical energy to the machining apparatus.

Referring to the drawing, the apparatus there shown comprises a stand 10 having an upright 11 on which is secured a machining tank 12. The work piece W is suitably clamped in place near the bottom of the tank so as to lie beneath a tool or electrode 13. The electrode is attached to the lower end of a feed rod 14 which is vertically slidable in a bushing 15 made of non-conductive material. The upper end of the rod 14 is threaded to receive a nut 16 carrying a gear wheel 17 made of a non-conductive material. Gear 17 is driven by spur gear 18 mounted on a shaft 19 rotated by a servomotor M. The construction is such that servomotor M varies the vertical position of electrode 13 to maintain a predetermined small gap between the lower end of the electrode and the machined surface of the work piece.

The rod 14 is biassed downwardly to hold nut 16 against the top of bushing 15 by a spring 20 which is normally in tension and is connected at its ends to the pin 21 on rod 14 and the pin 22 mounted in bushing 15. A motor 23 drives a pump 24 which withdraws machining fluid from the tank 12 and delivers it under pressure to the bore 25 in the electrode 13, whence it flows through the gap between the electrode and work piece and into the tank.

Electrical energy for the apparatus is provided by a variable frequency oscillator and amplifier unit 30 which delivers either a sine wave or a square wave output to the primary winding of an output transformer 31. This transformer may be constructed with multiple secondary windings (not shown) which can be connected in various combinations to permit impedance matching between the amplifier and the spark generating circuit. The alternating current provided by the transformer 31 is delivered through a capacitor C and a resistor R to leads 32 and 33 connected to the electrode and work piece, respectively. A silicon rectifier or diode D is connected in shunt across the gap and resistor R to permit charging of the capacitor on one half cycle and to place twice the charging voltage across the gap on the next half cycle. This causes a spark discharge to take place across the gap, thereby discharging the capacitor which is again charged on the next half cycle.

The average gap voltage is sensed by a servoamplifier 34 and compared with a reference voltage. The difference in voltage, if any, is amplified and fed through leads 35 to the electric servomotor M to drive it in the proper direction to restore the gap voltage to the desired value as determined by the reference voltage. In this way the electrode 13 is fed toward or away from the work piece to maintain the gap constant.

In gathering the data given in the examples, a square wave input was used at a frequency of 20 kc. and a maximum current of 15 amps. Condenser C. had a capacity of 40 mfd. and R had zero resistance. In Examples 1 to 15 the machining tool was brass, and in Examples 16 and 17 the tool was a 50:50 zinc-tin alloy. The brass tools were 0.5 in. diameter rods and the zinc-tin tools were 1 in. diameter rods. The work pieces in all examples were AISI 1018 steel. The quantities of the several ingredients of the machining fluids are given in parts by volume.

The fluids disclosed herein were also tested on a commercial type of electro-discharge machine apparatus and were found to give results comparable to those obtained with equipment of the type described above. The metal removal efficiency values given in the examples are, as indicated above, the volumetric ratios of metal removed from the work piece to metal removed from the tool. Values for "machining rate" are in terms of cubic inches of metal removed per ampere-minute multiplied by $10^4$.

In order to provide a basis for comparing the efficiencies and machining rates obtained with the present compositions with those of the prior art compositions, runs were made using several conventional machining fluids in the same apparatus and under the same conditions used in obtaining the data given in the specific examples. The results of these tests with prior machining fluids are as follows:

A. BRASS TOOL

| Machining Fluid | Efficiency | Machining Rate |
|---|---|---|
| Hydrocarbon oil (Sohio Spin 60) | 2.8 | 2.5 |
| Hydrocarbon oil (Elox No. 6) | 2.7 | 2.7 |
| n-Hexane | 2.0 | 1.9 |
| Paraffin oil (50 vis) | 2.0 | 2.7 |

B. ZINC-TIN ALLOY TOOL

| Machining Fluid | Efficiency | Machining Rate |
|---|---|---|
| Paraffin oil (50 vis) | 7.6 | 3.4 |

*Example 1*

Component: Amount
  Polyethylene glycol (M.W. 200) _____ 65.0
  Ethylene glycol monoethyl ether _____ 17.0
  Water _____ 17.0
  Surface active agent (Renex 30) _____ 0.5
  Triethanolamine _____ 0.5
Metal removal efficiency, 19.0.
Machining rate, 3.5.

*Example 2*

Component:
  Triethylene glycol _____ 50.0
  Octylphenyl ether of nonaethylene glycol ____ 25.0
  Water _____ 22.0
  Surface active agent (Renex 20) _____ 2.0
  Diethanolamine _____ 1.0
Metal removal efficiency, 15.0.
Machining rate, 5.5.

*Example 3*

Component:
  Polyethylene glycol (M.W. 400) _____ 60.0
  Ethylene glycol monomethyl ether _____ 10.0
  Water _____ 27.5
  Monoethanolamine _____ 2.5
Metal removal efficiency, 14.0.
Machining rate, 6.9.

*Example 4*

Component:
  Tetraethylene glycol _____ 45.0
  Ethylene glycol monoethyl ether _____ 20.0
  Water _____ 31.5
  Surface active agent (Renex 20) _____ 1.5
  Isopropylamine _____ 2.0
Metal removal efficiency, 27.0.
Machining rate, 6.3.

*Example 5*

Component:
  Polyethylene glycol (M.W. 300) _____ 40.0
  Ethylene glycol monohexyl ether _____ 22.5
  Water _____ 35.0
  Surface active agent (glycerol mono-oleate) __ 1.0
  Diethanolamine _____ 1.5
Metal removal efficiency, 29.0.
Machining rate, 6.5.

Example 6

Component:
- Polyethylene glycol (M.W. 200) _____ 55.0
- Nonylphenyl ether of octaethylene glycol ___ 35.0
- Water _____ 5.0
- Surface active agent (GAFAC-RM 710 Antara) _____ 2.5
- Rust inhibitor (Alrosol O) _____ 2.5

Metal removal efficiency, 14.0.
Machining rate, 2.5.

Example 7

Component:
- Triethylene glycol _____ 35.0
- Ethylene glycol monoethyl ether _____ 30.0
- Water _____ 32.0
- Surface active agent (Renex 30) _____ 1.0
- Triethanolamine _____ 2.0

Metal Removal Efficiency, 6.7.
Machining rate, 4.7.

Example 8

Component:
- Diethylene glycol _____ 70.0
- $C_{18}H_{36}O(CH_2CH_2O)_{20}H$ _____ 2.5
- Water _____ 25.0
- Surface active agent (glycerol mono-oleate) __ 2.5

Metal removal efficiency, 28.0.
Machining rate, 5.3.

Example 9

An aqueous solution of ethylene glycol was prepared containing two parts by volume of the glycol per part of water and tested as described above. The metal removal efficiency was 7.3 and the machining rate 3.3.

Example 10

Aqueous solutions of triethylene glycol were prepared in three volumetric ratios (glycol/water) and tested as described above with the following results.

| Ratio | M.R. Efficiency | Machining Rate |
|---|---|---|
| 9:1 | 11.2 | 3.7 |
| 7:3 | 7.1 | 4.7 |
| 6:4 | 6.8 | 4.4 |

Example 11

Aqueous solutions of tetraethylene glycol in the indicated volumetric ratios of glycol to water gave the following results.

| Ratio | M.R. Efficiency | Machining Rate |
|---|---|---|
| 9:1 | 11.1 | 3.9 |
| 7:3 | 11.3 | 4.3 |
| 6:4 | 9.5 | 4.1 |

Example 12

Aqueous solutions of polyethylene glycols identified by the trade name Carbowax and having the molecular weights 200 and 400 were prepared and tested. Both solutions contained 70% by volume of the polyglycol.

| Component | M.R. Efficiency | Machinging Rate |
|---|---|---|
| Carbowax 200 | 21.1 | 5.8 |
| Carbowax 400 | 6.1 | 4.8 |

Example 13

Component: Amount
- Carbowax 1500 _____ 32.5
- Carbowax 200 _____ 32.5
- Ethylene glycol monoethyl ether _____ 17.0
- Surface active agent (Renex 20) _____ 0.5
- Triethanolamine _____ 0.5
- Water _____ 17.0

Metal removal efficiency, 11.
Machining rate, 7.0.

In connection with the above formulation it may be noted that Carbowax 1500 is a blend of approximately equal amounts of 285 to 315 M.W. polyglycol and 1300 to 1600 M.W. polyglycol.

Example 14

Component: Amount
- Carbowax 1500 _____ 43.0
- Carbowax 200 _____ 22.0
- Ethylene glycol monoethyl ether _____ 17.0
- Surface active agent (Renex 20) _____ 0.5
- Triethanolamine _____ 0.5
- Water _____ 17.0

Metal removal efficiency, 7.1.
Machining rate, 6.0.

Example 15

Component:
- Carbowax 6000 _____ 8.0
- Carbowax 4000 _____ 8.0
- Carbowax 200 _____ 49.0
- Ethylene glycol monoethyl ether _____ 17.0
- Surface active agent (Renex 20) _____ 0.5
- Triethanolamine _____ 0.5
- Water _____ 17.0

Metal removal efficiency, 4.0.
Machining rate, 5.4.

Example 16

Component:
- Tetraethylene glycol _____ 45.0
- Ethylene glycol monophenyl ether _____ 20.0
- Water _____ 31.5
- Surface active agent (Renex 20) _____ 1.5
- Isopropylamine _____ 2.0

Metal removal efficiency, 8.8.
Machining rate, 5.0.

Example 17

Component:
- Polyethylene glycol (M.W. 200) _____ 65.0
- Ethylene glycol monoethyl ether _____ 19.0
- Water _____ 15.0
- Surface active agent (Renex 30) _____ 0.5
- Triethanolamine _____ 0.5

Metal removal efficiency, 7.3.
Machining rate, 5.4.

From the foregoing examples it should be apparent that superior metal removal efficiencies and machining rates can be attained by using the machining fluids of the present invention. The machining fluids disclosed herein not only provide high metal removal efficiencies but other advantages as well. Thus when machining fluids of the present type are employed, a stable arc is achieved sooner than with hydrocarbon oils and a more nearly complete usage of arc frequency with fewer misses is achieved. The removed metal particles settle out of the present fluids well and can be more readily filtered therefrom. Also the present fluids provide a wider variety of properties to meet varying machining requirements. While the data given in the examples were obtained with metal electrodes, it will be recognized that carbon electrodes can also be used in the present process.

It is of course to be understood that the foregoing examples are intended to be merely illustrative and that numerous changes can be made in the ingredients, proportions, and conditions set forth therein without depart-

We claim:

1. An electro-discharge machining fluid consisting essentially of from 35% to 70% by volume of an ethylene glycol of the formula $HOCH_2(CH_2OCH_2)_nCH_2OH$ wherein $n$ is selected from 0 and the positive integers, from 2.5% to 35% by volume of a monoether of ethylene glycol of the formula $ROCH_2(CH_2OCH_2)_mCH_2OH$ wherein $m$ is 0 to 10 and R is selected from alkyl, aryl, alkaryl and aralkyl groups containing from 1 to 20 carbon atoms, and 5% to 35% by volume of water.

2. An electro-discharge machining fluid according to claim 1 and wherein said ethylene glycol is a polyethylene glycol of molecular weight 150 to 300.

3. An electro-discharge machining fluid according to claim 1 and containing a minor proportion of alkanolamine as a rust inhibitor.

4. An electro-discharge machining fluid consisting essentially of from 35% to 70% by volume of a polyethylene glycol having a molecular weight of 150 to 300, from 2.5% to 35% by volume of an alkyl ether of ethylene glycol and 5% to 35% by volume of water.

5. An electro-discharge machining fluid according to claim 4 and wherein said alkyl ether of ethylene glycol is the monoethyl ether of ethylene glycol.

6. An electro-discharge machining fluid consisting essentially of an aqueous solution of an ethylene glycol having the formula $HOCH_2(CH_2OCH_2)_nCH_2OH$ wherein $n$ has the value 0 to 35, said solution comprising 65% to 90% by volume of said glycol and a minor proportion of an alkanolamine as a rust inhibitor.

7. An electro-discharge machining fluid consisting essentially of 65% to 90% by volume of polyethylene glycol having a molecular weight of 150 to 300, 0.5% to 2.5% by volume of an alkanolamine and 10% to 35% water.

8. The method of electro-discharge machining which comprises passing high frequency electrical discharges of short duration from an electrode to a work piece to be machined while said electrode and work piece are bathed in a machining fluid which is an aqueous solution of an ethylene glycol of the formula $$HOCH_2(CH_2OCH_2)_nCH_2OH$$

wherein $n$ is selected from zero and the positive integers, said solution containing from 65% to 90% by volume of said glycol.

9. The method of electro-discharge machining which comprises passing high frequency electrical discharges of short duration from an electrode to a work piece to be machined while said electrode and work piece are bathed in a machining fluid essentially composed of 65% to 90% by volume polyethylene glycol of a molecular weight 150 to 300 and water.

10. The method of electro-discharge machining which comprises passing high frequency electrical discharges of short duration from an electrode to a work piece to be machined while said electrode and work piece are bathed in a machining fluid essentially composed of an aqueous solution of at least 35% by volume of ethylene glycol of the formula $HOCH_2(CH_2OCH_2)_nCH_2OH$ wherein $n$ is selected from zero and the positive integers, and at least 2.5% by volume of a monoether of ethylene glycol of the formula $ROCH_2(CH_2OCH_2)_mCH_2OH$ wherein $m$ has the value zero to 10 and R is selected from alkyl, aryl, alkaryl and aralkyl groups containing 1 to 20 carbon atoms.

11. A method of electro-discharge machining which comprises passing high frequency electrical discharges of short duration from an electrode to a work piece to be machined while said electrode and work piece are bathed in a machining fluid as defined in claim 1.

References Cited
UNITED STATES PATENTS

| | | | | |
|---|---|---|---|---|
| 3,061,708 | 10/1962 | Pfau | | 219—69 |
| 3,168,638 | 2/1965 | Riddles | | 219—69 |

RICHARD M. WOOD, *Primary Examiner.*

R. F. STAUBLY, *Assistant Examiner.*